United States Patent

[11] 3,619,027

[72] Inventors W... R...
James H. Gisbrecht, Rolling Hills, both of Calif.
[21] Appl. No. 44,747
[22] Filed June 9, 1970
[45] Patented Nov. 9, 1971
[73] Assignee Northrop Corporation
Beverly Hills, Calif.

[54] OPTICAL SIGHTING DEVICE FOR FULL HEMISPHERIC VIEWING EMPLOYING A PECHAN PRISM
3 Claims, 8 Drawing Figs.

[52] U.S. Cl............................................. 350/6, 350/24, 350/285, 350/286, 350/287
[51] Int. Cl............................................. G02b 17/00, G02b 5/04, G02b 7/18
[50] Field of Search............................................. 350/6, 22-24, 26, 285, 286, 287

[56] References Cited
UNITED STATES PATENTS
3,463,567  8/1969  Bohmer............................................. 350/26

Primary Examiner—David Schonberg
Assistant Examiner—Paul A. Sacher
Attorneys—Harold L. Fox and Willard M. Graham ABSTRACT: Optical equipment including a Pechan prism functioning to retain the image plane (eyepiece) in a fixed relation with respect to nonmovable components of the equipment while making possible full hemispherical viewing.

INVENTORS:
William G. Baker
James H. Gisbrecht

By Harold L. Fox

AGENT

OPTICAL SIGHTING DEVICE FOR FULL HEMISPHERIC VIEWING EMPLOYING A PECHAN PRISM

The present invention pertains generally to optical equipment and more particularly to sighting equipment in which the viewing plane of the equipment has a fixed relation, in a lateral sense, with respect to nonmovable components of the equipment while allowing full hemispherical viewing.

Various types of equipment and systems have been disclosed, and are currently available, functioning in a manner similar to the apparatus disclosed herein. However, to the best of Applicant's knowledge apparatus constructed and functioning in the manner described herein has not been disclosed and is not available to date.

An object of the present invention is to provide an optical sight incorporating a minimum number of parts.

Another object is to provide an optical sight lending itself to a great number of installations.

Another object is to provide an optical sight which is relatively free of malfunctioning tendencies, economical to manufacture and simple to operate.

Figure 7:
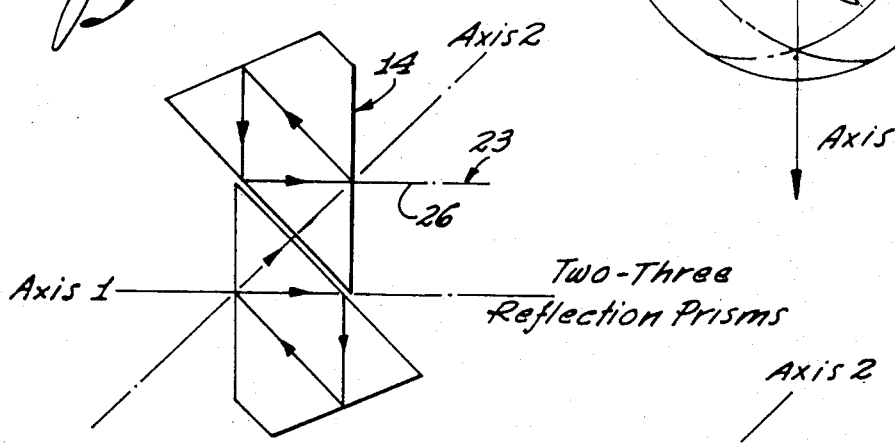
Figure 8:
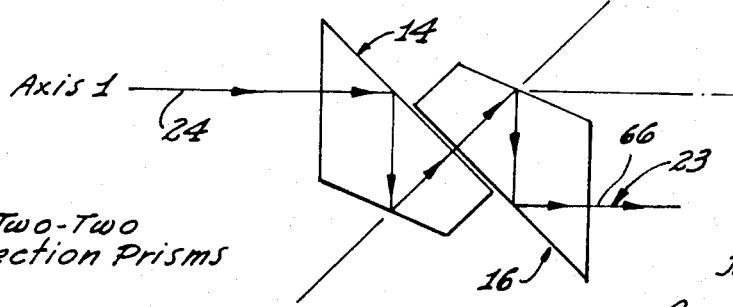

FIGS. 7 and 8 show the Pechan prism assembly resulting in the individual prisms reflecting the line-of-sight 3 and 2 times reflections respectively, but in which the entering and exiting portions of the line-of-sight are offset with respect to each other.

Figure 1:
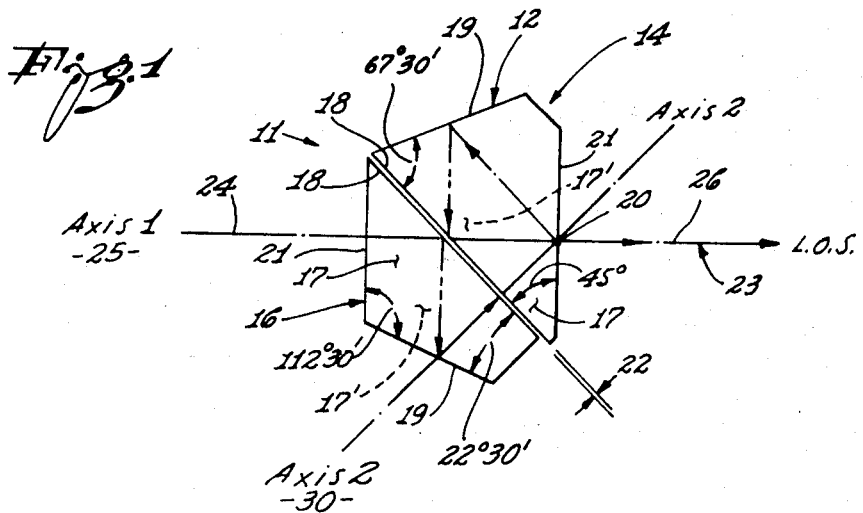
FIG. 1 shows schematically the essential components of the optical equipment (sighting device) as disclosed herein showing a relation referred to as the "original position" thereof, also showing the line-of-sight of the device and first and second axes about which components of the device rotate.
Figure 2:
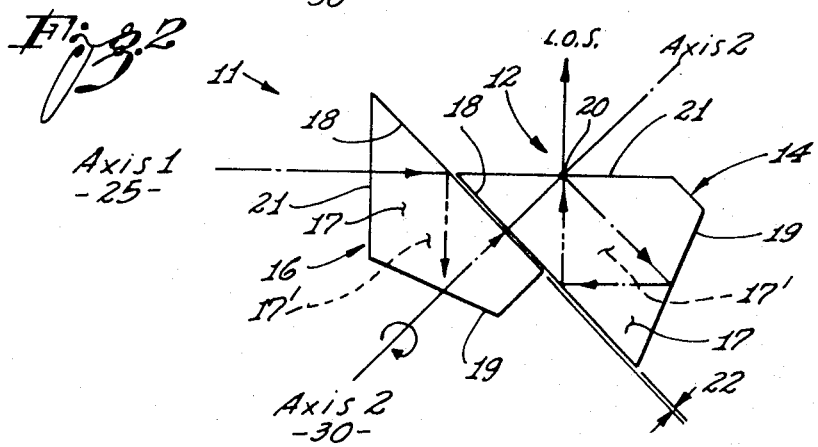
FIGS. 2 and 3 are views similar to FIG. 1 but in which certain components of the device have been rotated about the second axis.
Figure 3:
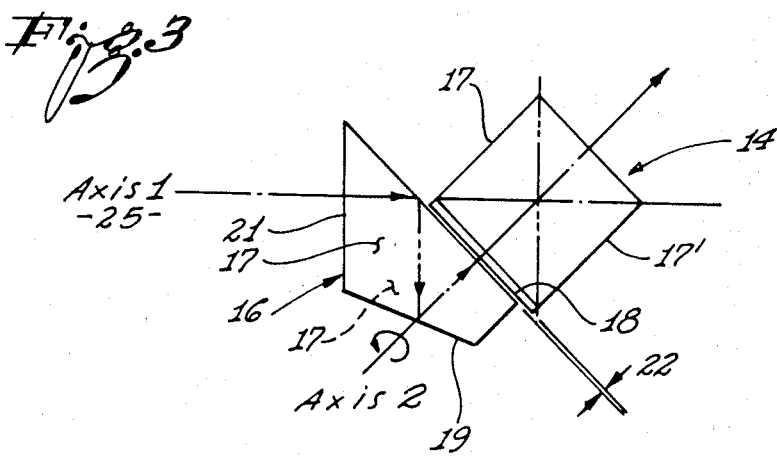

Referring to the drawings, a sighting device 11, also the novel manner in which it functions, is schematically shown in FIGS. 1-3, inclusive. In these figures principal components of the sighting device 11 define a Pechan optical prism 12. The arrangement and function of a conventional Pechan prism is well known to those skilled in the art. However, to render the specification complete and clear, a brief description of the same follows.

The Pechan optical prism 12 includes a pair of optical prisms 14 and 16 hereinafter referred to as fore and aft prisms, respectively, having a configuration and relation substantially as shown in FIGS. 1-3. The individual prisms 14 and 16 include parallel side faces 17 and 17', and edge faces referred to as major, minor and intermediate faces 18, 19 and 21, respectively. The respective length of the major, minor and intermediate faces are in the ratio of 1.707:1.00:1.084. The included angles between the edge faces of the prisms are shown in FIG. 1. In the foregoing illustration the length of the minor face is considered as unity. However, it should be understood that the length of the respective faces may be increased or decreased depending upon the size of the particular installation in which the Pechan prism is utilized.

FIGS. 1-3 show the prisms 14 and 16 in various relationships which they are caused to assume during their operation. FIG. 1 is referred to as the normal or original position of the prisms 14 and 16. Referring further to FIGS. 1-3, it will be seen that the individual prisms 14 and 16 are mounted with their major faces 18 in parallel spaced relation providing an airgap therebetween identified by the numeral 22.

Mounted in the normal or original position, as described above and shown in FIG. 1, the prisms 14 and 16 define a line-of-sight or optical axis 23. The line-of-sight 23 includes initial and terminal straight line portions 24 and 26 located externally of the assembly 12. It will also be seen that the internal portion of the line-of-sight 23 is reflected several times, in a conventional manner, by the faces of the prisms 14 and 16, and that the portions 24 and 26, are aligned.

The assembly 12 also defines a first axis 25, coinciding with the straight portions of the line-of-sight 23, about which the Pechan prism 12 is rotated in its entirety. The assembly 12 still further defines a second axis 30 having a normal relation with respect to the major faces 18, and a 45° relation with respect to the first axis as shown in FIG. 1. The prism 14 is gimbaled to impart to the prism, 2° of freedom, allowing angular movement thereof about a point represented by the intersection of axis number 2 (axis 30) with the intermediate face 21 of prism 14, identified by the numeral 20, and axis number 1 (axis 25).

Mounted in the above manner, it will be apparent that the sighting device 11 provides full hemispherical viewing as angular movement is imparted to the prisms 14 and 16 about the first and second axes. For example, angular movement of 180° of the prism 14, about axis number 2, results in the line-of-sight being directed from the straight forward position (FIG. 1), to the 45° position (FIG. 3) to the vertical position (FIG. 2) and all positions therebetween. Accordingly it will be seen that all other points in the hemisphere, forward of the line-of-sight, may be viewed by selectively imparting angular movement to the Pechan prism 12 as a unit about axis number 1. Thus it will be seen that a sighting device, comprising the Pechan prism 12 functions in a novel manner providing full hemispherical viewing while maintaining the fixed relation of the image plane in a lateral sense.

Alternate methods in which the Pechan prism (prisms 12 and 14) may be mounted are shown in FIGS. 7 and 8. FIGS. 7 and 8 are similar to FIG. 1, except in FIG. 7 the line-of-sight 23 is reflected six times while in FIG. 8 the line-of-sight is reflected 4 times, also in each case (FIGS 7 and 8) the initial or entering portion of the line-of-sight 23 is offset with respect to the terminal portion 26 thereof. Those familiar with the art will have no trouble tracing the course of the line-of-sight through the prism assembly (prisms 14 and 16) and further explanation in this respect is believed unnecessary.

Figure 4:
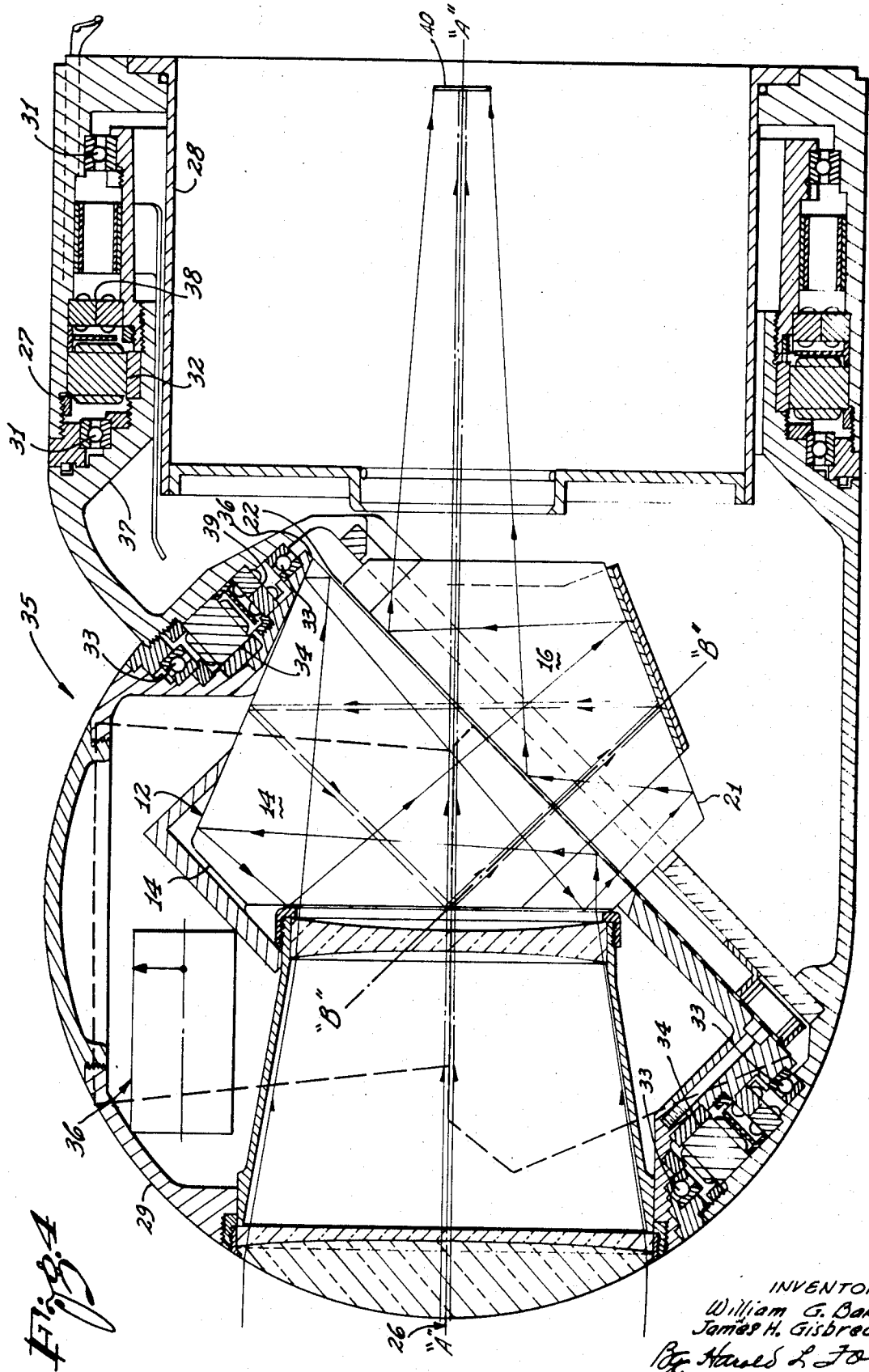
FIG. 4 is a cross-sectional view of a preferred embodiment showing structure for mounting the Pechan prism assembly and associated components enabling the assembly to function in a desired manner.

Referring further to the drawings, FIG. 4 shows preferred structure 35 for mounting the Pechan prism assembly 12 rendering it operational in the manner described above. A structure 35 includes a cylindrical eyepiece tube 28, and movable and nonmovable hollow cylindrical housings 37 and 27, respectively, the latter having a surrounding relation with respect to the eyepiece tube 28. The movable housing 37 extends beyond the end of tube 28 (FIG. 4) and terminates in a separate hemispherical head 29 the latter being mounted for angular movement thereof. Bearings 31 and 33 constitute means allowing angular movement to be imparted to the housing 37, with respect to nonmovable housing 27 and housing 29 with respect to housing 37, substantially as shown in FIG. 4.

Rotation or angular movement of the housing 37 about the axis A—A is imparted thereto by torquers or electric motors 32. Similarly torquers 34 constitute means for imparting angular movement to the hemispherical housing 29 about the axis B—B, shown in FIG. 4.

Mounted on a surface 36, to which angular movement can only be imparted about the axis A—A by the torquers 32, is the Pechan prism assembly 12, as previously described. As shown in FIG 4, the Pechan assembly 12 includes the fore and aft prisms 14 and 16 mounted in their original or normal position in spaced relation separated by the airgap 22. The line-of-sight, externally of the prisms 14 and 16 coincides with the axis A—A and is reflected internally thereof as previously described. The position of the prism 12, corresponding to the position of the assembly 12 as shown in FIG. 2, is shown in dotted construction in FIG. 4.

It will be apparent, by referring further to FIG. 4, that the mounting of the Pechan prism 12 allows 2° of freedom to be imparted thereto. In fact the mounting constitutes a gimbal-like mounting allowing rotation, i.e., angular movement, of the prism 14 about the axes A—A and B—B. Thus it will be seen that the mounting of the Pechan prism assembly 12 permits full hemispherical viewing to be effected, while the image plane, identified by the numeral 40, remains in a fixed relation with respect to nonmovable structure (not shown) associated with the structure 24 in a lateral sense. In FIG. 4 the axes A—A and B—B correspond to the axis number 1 and axis number 2, respectively, of FIGS. 1-3.

Also shown in FIG. 4 is a 2-axis gyro 36, with axes orthogonal to terminal line of sight 26 functioning to stabilize movement of the sighting device with respect to the axes A—A and B—B. Also shown are pickoff members 38 and 39 providing signals corresponding to specific rotational positions of the Pechan prism about the axis A—A and B—B. Signals received from the pickoff members 38 and 39 may be transmitted to a computer, for example, and used in a conventional manner providing desired results. In this respect angular movement of the structures 37 and 29 may be controlled by an operator thereof or automatically as described above. The hemispherical, shell-like structure includes portions constructed of a transparent material directly aligned with the line-of-sight at such time as the fore and aft prisms are in their original positions.

Figure 5:
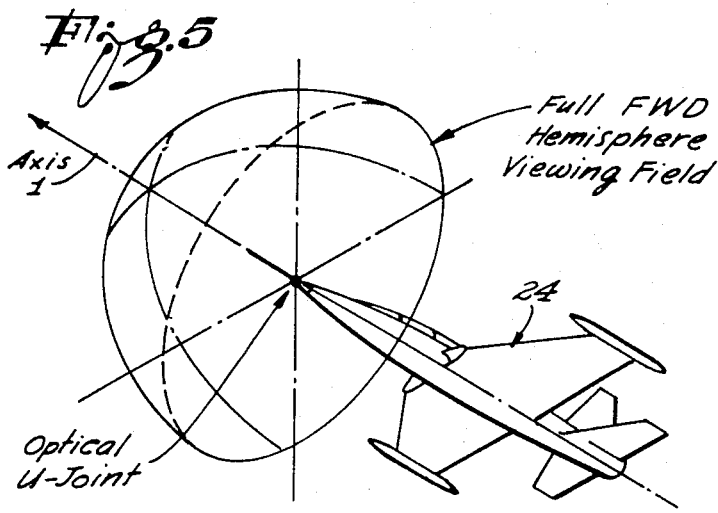
FIGS. 5 and 6 show general mounting arrangements of the subject apparatus in an aircraft, for forward and horizontal viewing.
Figure 6:
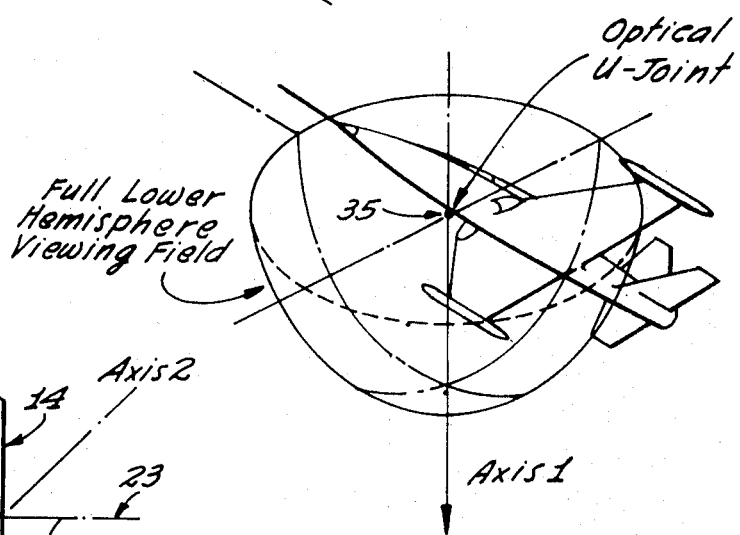

FIGS. 5 and 6 show installations of the present sighting device 35 in an aircraft 34. In FIGS. 5 and 6, the axis A—A of the device 35 is mounted parallel to the roll axis and parallel to the yaw axis of the aircraft, respectively, providing full forward hemispherical viewing and full vertical hemispherical viewing in a downward direction, respectively.

Thus it will be seen that an optical-sighting device is provided, functioning to satisfy the various objectives of the invention set forth above.

We claim:
1. In an optical-sighting system having a stabilized image plane and providing a hemispherical field of vision, the combination comprising:
   a. a Pechan optical prism assembly comprising individual fore and aft optical prisms;
   b. each of said individual prisms including spaced parallel side faces and respective major, minor and intermediate edge faces having a normal relation with respect to the side faces of the individual prism associated therewith;
   c. mounting structure including fixed first and second portions defining respective first and second axes, the latter axis having a 45°relation with respect to said first axis;
   d. said first and second portions having combined angular movement imparted thereto about said first and second axes and said second portions having angular movement imparted thereto about said second axis independently of angular movement imparted to said first portions;
   e. said aft prism having an original position in which it is fixedly secured to said first portions with the intermediate face thereof having a normal relation with respect to said first axis;
   f. said forward prism having an original position in which it is mounted on said second portions having a juxtaposed relationship with respect to said aft prism and the major faces of said fore and aft prisms having a parallel relation spaced apart a predetermined distance with respect to each other;
   g. said fore and aft prisms movable to a plurality of other positions responsive to angular movement of said first and second portions;
   h. said fore and aft prisms cooperating to define a line-of-sight including original terminal and intermediate portions and in which the original and terminal portions are aligned at such time as said fore and aft prisms are in their original positions;
   j. the terminal portion having a normal relation with respect to the intermediate edge face of said foreprism in all positions thereof causing said line-of-sight to cover a full hemispherical field of vision resulting from angular movement being imparted to said first and second portions while the original portion of said line-of-sight and
   k. the predetermined distance between said major faces remains constant for all other positions of said foreprism.

2. In apparatus as set forth in claim 1, the combination including bearing means allowing angular movement of an electric means for imparting angular movement to said first and second portions with respect to said fixed portions, respectively.

3. In apparatus as set forth in claim 1, the combination in which said second portions include a hemispherical, shell-like structure, and in which at least portions thereof directly aligned with the line-of-sight at such time as the fore and aft prisms are in their original positions, are constructed of a transparent material.

* * * * *